(12) United States Patent
Bevans et al.

(10) Patent No.: US 9,617,192 B2
(45) Date of Patent: Apr. 11, 2017

(54) PROCESSES FOR PRODUCING WEATHER RESISTANT COMPOSITIONS AND PRODUCTS OBTAINED THEREFROM

(75) Inventors: Basil Bevans, Quincy, IL (US); Dan S. Hickman, Payson, IL (US); Kimberly C. Hickman, legal representative, Payson, IL (US); David P. Holzgraefe, Quincy, IL (US); Bruce W. Moechnig, Quincy, IL (US)

(73) Assignee: Archer-Daniels Midland Company, Decatur, IL (US)

( * ) Notice: Subject to any disclaimer, the term of this patent is extended or adjusted under 35 U.S.C. 154(b) by 1526 days.

(21) Appl. No.: 11/938,865

(22) Filed: Nov. 13, 2007

(65) Prior Publication Data

US 2008/0113064 A1 May 15, 2008

Related U.S. Application Data

(60) Provisional application No. 60/858,520, filed on Nov. 13, 2006.

(51) Int. Cl.
| | |
|---|---|
| *A23K 1/00* | (2006.01) |
| *C05G 3/00* | (2006.01) |
| *A23K 40/10* | (2016.01) |
| *A23K 40/30* | (2016.01) |
| *A23P 10/20* | (2016.01) |
| *A23P 10/30* | (2016.01) |

(52) U.S. Cl.
CPC ............ *C05G 3/0058* (2013.01); *A23K 40/10* (2016.05); *A23K 40/30* (2016.05); *A23P 10/20* (2016.08); *A23P 10/30* (2016.08); *C05G 3/0041* (2013.01); *Y10T 428/2991* (2015.01)

(58) Field of Classification Search
CPC ........ A23K 1/002; A23K 1/004; A23K 40/10; A23K 40/30; A23L 1/0017; A23L 1/0029; C05G 3/0041; C05G 3/0058; Y10T 428/2991; A23P 10/20; A23P 10/30
USPC .................. 426/72, 807, 302; 427/215, 212; 428/403; 252/182.32, 88.1; 71/31
See application file for complete search history.

(56) References Cited

U.S. PATENT DOCUMENTS

| | | | | |
|---|---|---|---|---|
| 2,685,517 | A * | 8/1954 | Dunmire .......................... | 426/72 |
| 3,146,167 | A * | 8/1964 | Lantz, Jr. et al. ............ | 424/489 |
| 3,219,433 | A * | 11/1965 | Brewster et al. ............ | 71/64.11 |
| 3,276,857 | A * | 10/1966 | Sor et al. ..................... | 71/64.03 |
| 3,464,824 | A * | 9/1969 | Doody .................. | A23K 40/10 426/285 |
| 3,541,204 | A * | 11/1970 | Linton et al. .................. | 424/438 |
| 3,549,746 | A * | 12/1970 | Athanas et al. ............... | 424/495 |
| 3,585,022 | A * | 6/1971 | Gray .............................. | 504/187 |
| 4,075,325 | A * | 2/1978 | Kauzal .......................... | 424/630 |
| 4,533,557 | A * | 8/1985 | Maruyama et al. ............ | 426/61 |
| 4,582,708 | A * | 4/1986 | Tipton ..................... | A23K 1/009 426/62 |
| 4,698,225 | A * | 10/1987 | Morrison ............... | A23K 1/003 426/302 |
| 4,775,539 | A * | 10/1988 | Van de Walle ................. | 426/74 |
| 4,976,977 | A * | 12/1990 | Johnson et al. ................ | 426/96 |
| 5,283,059 | A * | 2/1994 | Suzuki et al. ............. | 424/93.46 |
| 5,405,648 | A * | 4/1995 | Hermann ................. | 427/213.31 |
| 5,871,802 | A * | 2/1999 | Gao ........................ | A23K 1/003 426/389 |
| 5,888,500 | A | 3/1999 | Marshall | |
| 5,935,626 | A * | 8/1999 | Moechnig et al. ............. | 426/74 |
| 5,997,939 | A * | 12/1999 | Moechnig et al. ........... | 426/656 |
| 6,013,286 | A * | 1/2000 | Klose .............................. | 426/2 |
| 6,080,221 | A | 6/2000 | Moore et al. | |
| 6,113,974 | A | 9/2000 | Winowiski et al. | |
| 6,238,727 | B1 | 5/2001 | Takemoto et al. | |
| 6,299,912 | B1 * | 10/2001 | Ito et al. ........................... | 426/2 |
| 6,325,934 | B1 | 12/2001 | Tobey, Jr. et al. | |
| 6,953,593 | B2 | 10/2005 | Kuhrts | |
| 2001/0025114 | A1 * | 9/2001 | Bijl ......................... | A23D 9/00 554/224 |
| 2002/0098239 | A1 | 7/2002 | Kuhrts et al. | |
| 2002/0150608 | A1 * | 10/2002 | Summer ....................... | 424/442 |
| 2003/0068390 | A1 * | 4/2003 | Miller et al. .................. | 424/738 |
| 2003/0129295 | A1 | 7/2003 | Richardson et al. | |
| 2003/0152689 | A1 * | 8/2003 | Ethington, Jr. ......... | A23K 1/003 426/635 |
| 2003/0180352 | A1 * | 9/2003 | Patel et al. .................... | 424/465 |
| 2004/0052905 | A1 * | 3/2004 | Pelletier .................. | A23K 40/10 426/74 |
| 2004/0256315 | A1 | 12/2004 | Boyd et al. | |
| 2005/0183544 | A1 * | 8/2005 | McPherson ............. | C22B 1/244 75/770 |
| 2006/0039955 | A1 * | 2/2006 | Messman et al. ............. | 424/442 |
| 2006/0067984 | A1 | 3/2006 | Cavassini et al. | |
| 2006/0127531 | A1 * | 6/2006 | Jobe et al. ......................... | 426/2 |
| 2006/0170128 | A1 * | 8/2006 | Belanger ................. | A23K 40/10 264/117 |
| 2006/0198928 | A1 * | 9/2006 | Jobe et al. ....................... | 426/74 |
| 2007/0148212 | A1 * | 6/2007 | Okutani et al. ............... | 424/442 |

FOREIGN PATENT DOCUMENTS

| | | | |
|---|---|---|---|
| EP | 125894 | A2 * | 11/1984 |
| EP | 0940088 | A2 | 9/1999 |
| GB | 2 164 640 | A1 | 3/1986 |
| JP | 2000281575 | A1 | 10/2000 |
| JP | 2006193368 | A1 | 7/2006 |
| WO | 2006032958 | A2 | 3/2006 |

OTHER PUBLICATIONS

Rokey et al. "Pelleted Livestock Feed Production-Process description", downloaded from http://em.engormix.com?MA-poultry-industry/nutrition/articles/pelleted-livestock-feed-process, dated Sep. 11, 2006, 12 pages.*

(Continued)

*Primary Examiner* — Chhaya Sayala
(74) *Attorney, Agent, or Firm* — Andrew F Nilles

(57) ABSTRACT

Processes for producing weather resistant compositions are disclosed. Weather resistant compositions and uses thereof are also disclosed.

9 Claims, 1 Drawing Sheet

(56) References Cited

OTHER PUBLICATIONS

Winowiski "Pellet Quality in Animal Feeds", downloaded from http://www.adiveter.com/ftp/articles/articulo1476.pdf, Jan. 2001, 5 pages.*
Dictionary meaning of 'agglomerate' downloaded from http://www.oxforddictionaries.com/us/definition/american_english/agglomerate, 3 pages. on Aug. 9, 2014.*
"Mesh & Micron sizes" downloaded from www.industrialspec.com, 1 page, downloaded on Feb. 20, 2016.*
ADE Mineral w/CTC, Kent Feeds, Inc. 2000, pp. 10A-10B, USA.
Goat Mineral, Kent Feeds Inc., 2004, pp. 42A, USA.
OptiCor Optimizednutrition Core protection, ADM Alliance Nutrition Beef, ADM Alliance Nutrition, Oct. 30, 2006, pp. 1-3, http://www.admani.com/alliancebeef/Opticor.htm.
PCT, IPRP/Written Opinion, May 19, 2009, pp. 1-8.

\* cited by examiner

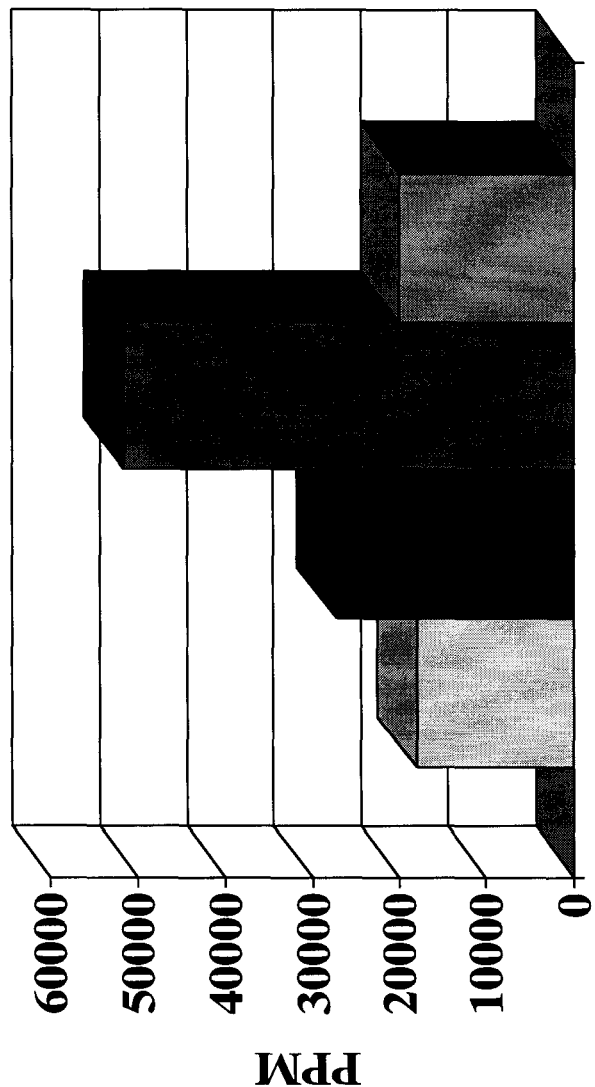

PROCESSES FOR PRODUCING WEATHER RESISTANT COMPOSITIONS AND PRODUCTS OBTAINED THEREFROM

CROSS REFERENCE TO RELATED APPLICATIONS

This application claims the priority benefit under 35 U.S.C. §119(e) to U.S. Provisional Application No. 60/858,520, filed Nov. 13, 2006, the disclosure of the entirety of which is incorporated by this reference.

TECHNICAL FIELD

The present invention relates generally to weather or water resistant compositions and, more particularly, to weather or water resistant compositions useful for delivering nutrients to microbial populations or animals.

BACKGROUND OF THE INVENTION

Weather-resistant mineral feeds for animals, sometimes referred to as "weatherized minerals," have been used for a number of years. Since these weather-resistant animal feeds are typically placed outdoors and fed ad libitum to the animals, these animal feeds become susceptible to wind and water which can break down, blow or wash away the minerals or other nutrients present in the weather-resistant animal feeds.

Some of the methods used to weatherize these animal feeds use petroleum based products such as a weatherizing agent, which may be costly as crude oil prices rise, or employ multiple steps to produce the weatherized feeds which may be time consuming or expensive.

Further, some methods of producing weatherized animal feed products use various processing equipment that may not be located at many facilities resulting in shipping costs that increase the price of the final product.

Thus, a process for producing a weatherized product that is economical and/or uses commonly available processing equipment is desired.

SUMMARY OF THE INVENTION

In one embodiment, a process includes reducing a surface area of a plurality of granules and mixing a vegetable based weatherizing agent with the plurality of granules having the surface area reduced such that the vegetable based weatherizing agent coats at least a portion of the plurality of granules. A product produced by the process is also described.

In another embodiment, a composition comprises a granule comprising a mineral, an agglomerate of at least two of the granules, or a combination thereof. The composition further includes a vegetable based weatherizing agent coating an outer surface area of the granule, the agglomerate, or the combination thereof. Upon passage of a quantity of water over the composition and collection of the quantity of water passed over the composition, less than 25,000 ppm of the mineral of the granule is present in the collected quantity of water.

In yet an additional embodiment, a process includes mixing a granule selected from the group consisting of a macro mineral granule, a micro mineral granule, a vitamin granule, a salt granule, and combinations of any thereof with an agglomerating agent such that agglomerates are formed. The process also includes mixing the agglomerates with a vegetable based weatherizing agent such that at least a portion of a surface of the agglomerates is coated with the vegetable based weatherizing agent. Upon passage of a quantity of water over the coated, agglomerates and collection of the quantity of water passed over the coated, agglomerates, less than 25,000 ppm of a mineral of the granule is present in the collected quantity of water. A product produced by the process is also described.

In yet a further embodiment, a composition comprises a granule, an agglomerate of at least two of the granules, or a combination thereof. The granule comprises a nutrient selected from the group consisting of a macro mineral, a micro mineral, a vitamin, salt, and combinations of any thereof. The composition also includes an agglomerating agent coating at least a portion of an outer surface of the granule, an outer surface of the agglomerate, or the combination thereof. The composition also includes a hydrophobic weatherizing agent of a plant origin that coats at least a portion of the outer surface of the granule, the outer surface of the agglomerate, or the combination thereof. Upon passage of a quantity of water over the granule, the agglomerate of at least two of the granules, or the combination thereof, and collection of the quantity of water passed over the granule, the agglomerate of at least two of the granules, or the combination thereof, less than 25,000 ppm of a mineral is present in the collected quantity of water.

DESCRIPTION OF THE DRAWINGS

FIG. 1 illustrates an amount of mineral leached from one embodiment of a weatherized composition of the present invention as compared to commercially available animal mineral products.

BEST MODE OF THE INVENTION

In each of its various embodiments, the present invention discloses processes for producing weatherized compositions as well as the weatherized compositions resulting from such processes. In various embodiments, these processes and the weatherized compositions produced from such processes may be used in the production of weatherized animal feed compositions.

In other embodiments, the processes for producing weatherized compositions and the compositions resulting from such processes are useful as compositions for delivering nutrients to microbes. Microbes are present in many different environments and microbial populations often live in symbiosis within such environments. For instance, microbial populations are present in the rumen of ruminants and help the ruminant break down food sources into useful nutrients. Microbial populations are also present in septic tanks, lagoons, or other biological treatment devices and help digest organic solids in such environments. Microbe communities in the soil help break down nitrogen containing compounds into a nitrogen form usable by plants growing in the soil. Further, communities of microbes are also used in various industries in fermentation reactions to produce useful chemicals. These are just a few examples of microbial populations in the world and the beneficial synergy in which these microbial populations exist. Thus, the present invention also finds utility in delivering weather and/or water resistant compositions to such microbial populations.

In various embodiments of the present invention, a surface area of the granules used to produce a weatherized composition is reduced. The surface area of the granules may be reduced by any one of or a combination of the following acts: pressure agglomeration including, without limitation, briquetting, compaction granulation, and/or tableting; tumbling agglomeration including, but not limited to, the use of a drum, disc, cone, and/or pin mixer; extrusion agglomeration including, without limitation, use of a low pressure screw, gear pelletizer, and/or pellet mill; or thermal agglomeration including, but not limited to, the use of flaking, pastillating, prilling and/or sintering.

In some embodiments, an agglomerating agent may be used to aid in reducing a surface area of a granule. Agglomerating agents useful in the processes of the present invention include, but are not limited to, corn syrup, liquid fermentation co-products, corn steep liquor, soy extracts, red clover extracts, kudzu extracts, flax extracts, alfalfa extracts, tea extracts, cocoa extracts, soy molasses, condensed distillers' solubles, pyrodextrins, dextrins, maltodextrins, gelatins, starches, high fructose corn syrup, byproduct streams from dextrose refining, sugar can bagasse, modified starches, liquefied starches, liquid lysine, liquid threonine, gums, pectins, and any combinations thereof.

In some embodiments, an agglomerating agent may be slowly added to granules in order to reduce the surface area of the granules. In one embodiment, the agglomerating agent may be added to the granules at one or more locations in a container housing the granules and added to the granules over a period of time such as, for example, of between about 1.5 to about 2 minutes. The granules may be in the process of being mixed in the container as the agglomerating agent is being added.

In other embodiments, a weatherizing agent may be used in place of or in addition to an agglomerating agent. In one embodiment, the weatherizing agent is a hydrophobic compound from a plant origin. In other embodiments, weatherizing agents useful in the present invention include, but are not limited to, vegetable oil such as, for example, sunflower oil, canola oil, flaxseed oil, rapeseed oil, jatropha oil, coconut oil, rice bran oil, wheat germ oil, corn fiber oil, corn oil, olive oil, diacyl glycerol, glycerol, propylene glycol, ethylene glycol, sorbitol, soy protein, canola protein, soy oil, peanut oil, cotton seed oil, palm oil, borage oil, hydrogenated vegetable oil, vegetable oil based waxes, vegetable based shortenings, lecithins, soapstocks, starches, modified starches, plant proteins, zein proteins, milk proteins, and any combinations thereof. In another embodiment, the weatherizing agent may be a hydrogenated or partially hydrogenated heat-bodied oil, as described in U.S. Nonprovisional patent application Ser. No. 11/708,998 filed Feb. 21, 2007, the disclosure of the entirety of which is incorporated by this reference.

In another embodiment, a weatherizing agent may be slowly added to granules in order to substantially coat a surface area of the granules or, when an agglomerating agent is used to reduce a surface area of the granules, to substantially coat a surface area of the agglomerates of the granules. In one embodiment, the weatherizing agent may be added to the granules or agglomerates at one or more locations in a container housing the granules or agglomerates and added to the granules or agglomerates over a period of time such as, for example, of between about 1.5 to about 2 minutes. The granules or agglomerates may be in the process of being mixed in the container as the weatherizing agent is being added.

In various embodiments, the agglomerates of the weatherized compositions of the present invention may have a size ranging from about 150 µm to about 2800 µm, and may have a median size of about 1250 µm to about 1450 µm.

In additional embodiments, agglomerated weatherized compositions of the present invention may be screened with screens having sizes of about ½ inch or about ¾ inch before packaging of the agglomerated weatherized compositions.

In yet other embodiments, various animal feed ingredients may be added to provide functionality to the weatherized compositions of the present invention. Such animal feed ingredients include, but are not limited to, insecticides, methoprene, pesticides, botanicals or botanical extracts (i.e., such as those described in US Patent Application 20060188549 incorporated herein in its entirety by this reference including without limitation, eugenol, cinnamaldehyde, capsaicin or any combinations thereof, nutraceuticals, dust reducing agents, antibiotics, an amino acid, soy flour, vitamins, bacterial cell walls and/or extracts, yeast cell walls and/or extracts, fungal cell walls and/or extracts, macro minerals or trace minerals such as those described in U.S. Pat. Nos. 5,935,626 and 5,997,939 (each of the contents of the entirety of which are incorporated by this reference), and any combinations thereof.

In some embodiments of the present invention where the weatherized compositions are used as animal feeds, the weatherized compositions are placed in containers configured for shipping such that the weatherized compositions may be transported from a first geographic location where the weatherized composition is produced to a second geographic location where the weatherized compositions is offered to an animal as feed. In other embodiments, the weatherized compositions may be placed in troughs or feeder units such that animals have the opportunity to consume the weatherized compositions.

In embodiments of the present invention where the weatherized composition finds utility as a fertilizer, ingredients that may be added to the weatherized compositions include, but are not limited to, insecticides, herbicides, bacterial cell walls and/or extracts, yeast cell walls and/or extracts, fungal cell walls and/or extracts, adsorbent polymers, and any combinations thereof. Other compounds that may be used to produce a weatherized composition for use as a fertilizer are disclosed in U.S. patent application Ser. No. 11/549,470 filed Oct. 13, 2006, entitled Fertilizer Compositions and Methods of Using, the contents of the entirety of which is incorporated herein by this reference.

In another embodiment, a container comprising the weatherized composition of the present invention may be associated with indicia configured to direct a user of the weatherized composition on how to use the weatherized composition. For instance, the indicia may direct the user on how much of the weatherized composition to offer to an animal or on how much of the weatherized composition to apply to plants, soil or combinations thereof.

The invention is further explained by use of the following EXAMPLES.

EXAMPLES

Example 1

In one embodiment, a weatherized composition for delivering nutrients to an animal was prepared. The granular compounds of Table 1 were placed into a ribbon mixer as a mass and mixed for a period of about two minutes. The macro minerals included calcium and magnesium containing compounds and the micro minerals included manganese, iron, zinc, copper, and iodine containing compounds. The vitamin pre-mix included vitamins commercially used in animal feed ingredients such as, for example, vitamin E. It will be apparent by those of ordinary skill in the art that the various types and amounts of compounds used in the macro minerals, micro minerals, and the vitamin pre-mix may be adjusted depending on various factors including, without limitation, the type of animal that the weatherized composition will be fed to, the geographic location of the animal, the nutritional need of the animals that the weatherized composition will be fed to, or any combinations thereof.

TABLE 1

| Compound | Amount, pounds |
|---|---|
| Macro Minerals | 2883.64 |
| Salt (i.e., NaCl) | 614.50 |
| 47.5% soybean meal | 100.00 |
| Micro Minerals | 124.93 |
| Vitamin Pre-mix | 36.93 |

An agglomerating agent was added to the mass of compounds and mixed for a period of about three minutes in the ribbon mixer. In this embodiment, 120.00 pounds of corn syrup was used as the agglomerating agent and was heated to a temperature higher than an ambient temperature of where the ribbon mixer is located such as about 105° F. During the mixing process, the surface area of the granules of the mass of compounds was reduced as agglomerates of the granules were formed.

A weatherizing agent was added to the agglomerates and mixed for a period of about three minutes. In this embodiment, 120.00 pounds of hydrogenated soy oil was used as the weatherizing agent and was heated to a temperature higher than an ambient temperature of where the ribbon mixer is located such as about 160° F. During the mixing process, the weatherizing agent substantially coated the agglomerates, thus producing a weatherized composition.

The produced weatherized composition includes the amounts and percentages of the compounds listed in Table 2.

TABLE 2

| Compound | Amount, pounds | Percentage |
|---|---|---|
| Macro Minerals | 2883.64 | 72.1 |
| Salt | 614.50 | 15.36 |
| 47.5% soybean meal | 100.00 | 2.50 |
| Micro Minerals | 124.93 | 3.10 |
| Vitamin Pre-Mix | 36.93 | 1.00 |
| Agglomerating agent (i.e., corn syrup) | 120.00 | 3.00 |
| Weatherizing agent (i.e., hydrogenated soy oil) | 120.00 | 3.00 |
| Totals: | 4000 | ~100.00 |

Example 2

In another embodiment, a weatherized composition for delivering nutrients to an animal was prepared. The granular compounds of Table 3 were placed into a ribbon mixer as a mass and mixed for a period of about two minutes. The macro minerals included calcium, magnesium, phosphorus, and potassium containing compounds, and the micro minerals included manganese, iron, zinc, copper, cobalt, selenium, and iodine containing compounds. The vitamin pre-mix included vitamins commercially used in animal feed ingredients such as, for example, vitamin E. It will be apparent by those of ordinary skill in the art that the various types and amounts of compounds used in the macro minerals, micro minerals, and the vitamin pre-mix may be adjusted depending on various factors including, without limitation, the type of animal that the weatherized composition will be fed to, the geographic location of the animal, the nutritional need of the animals that the weatherized composition will be fed to, or any combinations thereof.

TABLE 3

| Compound | Amount, pounds |
|---|---|
| Micro Minerals | 2322.23 |
| Distillers dried grains, MW | 773.00 |
| Salt | 429.50 |
| Micro Minerals | 181.88 |
| CITRISTIM ™ brand yeast product available from ADM Alliance Nutrition, Inc., of Quincy, Illinois | 15.80 |
| Vitamin Pre-Mix | 15.60 |
| Carmel flavor | 2.00 |

An agglomerating agent was added to the mass of compounds and mixed for a period of about three minutes in the ribbon mixer. In this embodiment, 160.00 pounds of corn syrup was used as the agglomerating agent and was heated to a temperature higher than an ambient temperature of where the ribbon mixer is located such as about 105° F. During the mixing process, the surface area of the granules of the mass of compounds was reduced as agglomerates of the granules were formed.

A weatherizing agent was added to the agglomerates and mixed for a period of about three minutes. In this embodiment, 100.00 pounds of hydrogenated soy oil was used as the weatherizing agent and was heated to a temperature higher than an ambient temperature of where the ribbon mixer is located such as about 160° F. During the mixing process, the weatherizing agent substantially coated the agglomerates, thus producing a weatherized composition.

The weatherized composition includes the amounts and percentages of the compounds listed in Table 4.

TABLE 4

| Compound | Amount, pounds | Percentage |
|---|---|---|
| Macro Minerals | 2322.23 | 58.10 |
| Micro Minerals | 181.88 | 4.55 |
| Distillers dried grains, MW | 773.00 | 19.33 |
| Salt | 429.50 | 10.74 |
| CITRISTIM ™ brand yeast product available from ADM Alliance Nutrition, Inc., of Quincy, Illinois | 15.80 | 0.40 |
| Vitamin Pre-Mix | 15.60 | 0.40 |
| Carmel flavor | 2.00 | 0.05 |
| Agglomerating agent (i.e., corn syrup) | 160.00 | 4.00 |
| Weatherizing agent (i.e., hydrogenated soy oil) | 100.00 | 2.50 |
| Totals: | ~4000 | ~100 |

Example 3

In another embodiment, a weatherized composition useful for delivering nutrients to a microbial population was prepared. Particles or granules of hi-protein soybean meal, lysine hydrochloride (HCl) and unclassified soy flour were placed into a ribbon mixer as a mass and mixed for a period of time sufficient to achieve uniform mixing.

The uniformly mixed particles were agglomerated with soy oil to reduce the surface area of the mixed particles. In this embodiment, 3/16 inch diameter pellets were agglomerated with a conventional pelleting process in a pellet mill with steam addition using pelleting temperatures of between about 150-180° F. In other embodiments, pelleting temperatures of between about 175-195° F. may be used. The pellets were cooled to ambient temperature in a dryer-cooler unit.

The cooled pellets were reduced in particle size using corrugated crumbling rolls and screened to achieve a uniform particle size of about 1800-2200 microns, thus producing the weatherized composition. It will be appreciated by those of ordinary skill in the art that any desired, finished particle size of the product may be achieved by adjusting the crumbling rolls, using various sized screens, varying a size of the pellet die, or any combination thereof to achieve the desired size. The weatherized composition includes the amounts and percentages of the compounds listed in Table 5.

TABLE 5

| Ingredient | Percentage (%) |
| --- | --- |
| Hi-Pro soybean meal | 59.00 |
| Lysine-HCl | 39.00 |
| Soy oil | 1.50 |
| Unclassified soy flour | 0.50 |
| Total: | 100.00 |

The weatherized composition of this Example may be fed to cattle, spread over plants and/or soil for use as a weather resistant fertilizer, or delivered to a microbial population using methods known by those of ordinary skill in the art. Other materials that may be used to form the weatherized compositions of this example for use as a fertilizer include, but are not limited to, soy protein concentrate, soy protein isolate, texturized vegetable protein obtained from any vegetable, partially-hydrogenated soy/other vegetable oil, hydrogenated soy/other vegetable oil, corn gluten meal, corn steep liquor, corn syrup, or combinations of any thereof.

Example 4

In another embodiment, a weather resistant animal feed produced using the procedure of Example 1 or Example 2 was compared to the commercially available animal feeds OPTICOR brand 646 range mineral and MASTERGAIN brand MG 12-6 breeder feed, both available from ADM Alliance Nutrition, Inc. of Quincy, Ill., to determine the effect of nutrient leaching with water on the animal feeds. In this example, a predetermined quantity of the animal feed was placed in a container having a perforated bottom, a predetermined amount of water was poured over the animal feed, and the water that drained through the perforated bottom was collected and analyzed for minerals. The amount of minerals in the collected water was determined in PPM (parts per million). FIG. 1 illustrates a graph of the concentration of minerals leached from a sample of a weather resistant animal feed produced with processes of the present invention (i.e., New WM 2 and WM 4 oz) as compared to the commercially available animal feeds (i.e., 646 Opticor and MG 12-6). As FIG. 1 illustrates, fewer minerals are leached from the weather resistant animal feeds of the present invention as compared to the commercially available animal feeds. The data used to generate FIG. 1 is also depicted in Table 6.

TABLE 6

| Animal Feed | PPM Nutrients Leached | % Increase of Nutrient Leach Over WM2 of the present invention |
| --- | --- | --- |
| WeatherMaster 2 | 18150 | 0 |
| WeatherMaster 4 | 20143 | 11.0 |
| 646 Range Mineral (Opticor) | 27249 | 50.1 |
| MG 12-6 Breeder | 51703 | 184.9 |

The present invention has been described with reference to certain exemplary embodiments, compositions and uses thereof. However, it will be recognized by those of ordinary skill in the art that various substitutions, modifications or combinations of any of the exemplary embodiments may be made without departing from the spirit and scope of the invention. Thus, the invention is not limited by the description of the exemplary embodiment, but rather by the appended claims as originally filed.

What is claimed is:

1. A process for making a granule weather resistant comprising:
   placing a plurality of granules selected from the group consisting of a macro mineral granule, a micro mineral granule, a vitamin granule, a salt granule, and combinations of any thereof in a mixer;
   heating an agglomerating; agent
   tumble agglomerating the agglomerating agent with the plurality of the granules in the mixer such that agglomerates are formed;
   heating a vegetable based weatherizing agent selected from the group consisting of hydrogenated vegetable oil, hydrogenated soy oil, vegetable based waxes, soy wax, vegetable based shortenings, hydrogenated heat-bodied oil, partially hydrogenated heat-bodied oil, and any combinations thereof; and
   mixing the vegetable based weatherizing agent with the agglomerates in the mixer such that a surface of at least a portion of the agglomerates is coated with the vegetable based weatherizing agent, thus forming agglomerates having a size ranging from 150 μm-2800 μm.

2. The process of claim 1, wherein upon passage of a quantity of water over the coated, agglomerates and collection of the quantity of water passed over the coated, agglomerates, less than 25,000 ppm of the mineral is present in the collected quantity of water.

3. The process of claim 1, further comprising screening the agglomerates.

4. The process of claim 1, wherein the agglomerates are not pelleted.

5. The process of claim 1, wherein mixing the agglomerating agent with the plurality of the granules such that the agglomerates are formed comprises tumble agglomerating the plurality of the granules with the agglomerating agent.

6. The process of claim 1, wherein the agglomerates have a median size of 1250-1450 μm.

7. The process of claim 1, wherein the agglomerates are not extruded.

8. The process of claim 1, wherein the agglomerating agent is present in the agglomerates at an amount of 3-4%.

9. The process of claim 1, wherein the vegetable based weatherizing agent is present in the agglomerates at an amount of 2.5-3%.

* * * * *